(12) United States Patent
Murali et al.

(10) Patent No.: US 9,160,551 B2
(45) Date of Patent: Oct. 13, 2015

(54) ANALYTIC RECORDING OF CONFERENCE SESSIONS

(75) Inventors: Kannan Murali, Fremont, CA (US); Gary Alan Skrabutenas, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 639 days.

(21) Appl. No.: 13/427,973

(22) Filed: Mar. 23, 2012

(65) Prior Publication Data
US 2013/0250035 A1  Sep. 26, 2013

(51) Int. Cl.
*H04N 7/14* (2006.01)
*H04M 3/42* (2006.01)
*H04L 12/18* (2006.01)
*H04M 3/56* (2006.01)
*H04N 7/15* (2006.01)

(52) U.S. Cl.
CPC ............. *H04L 12/1831* (2013.01); *H04M 3/56* (2013.01); *H04N 7/155* (2013.01); *H04M 3/42221* (2013.01); *H04M 2203/30* (2013.01)

(58) Field of Classification Search
CPC ......... G01L 12/16; G01L 12/66; G01L 12/28; G01L 12/56; H04M 3/56; H04N 7/155
USPC ................. 348/12.02, 3, 8, 9, 14.09
See application file for complete search history.

(56) References Cited

U.S. PATENT DOCUMENTS

| | | | |
|---|---|---|---|
| 6,418,125 B1 * | 7/2002 | Oran | 370/266 |
| 6,681,382 B1 | 1/2004 | Kakumani et al. | |
| 7,170,886 B1 | 1/2007 | Surazski et al. | |
| 7,450,705 B1 * | 11/2008 | Cohen | 379/202.01 |
| 7,808,521 B2 * | 10/2010 | Lengeling et al. | 348/14.08 |
| 8,587,634 B1 * | 11/2013 | Baldino et al. | 348/14.08 |
| 2008/0218582 A1 * | 9/2008 | Buckler | 348/14.08 |
| 2009/0055374 A1 | 2/2009 | Surazski et al. | |
| 2009/0089055 A1 * | 4/2009 | Caspi et al. | 704/235 |
| 2010/0284310 A1 | 11/2010 | Shaffer et al. | |
| 2012/0050456 A1 * | 3/2012 | Arnao et al. | 348/14.12 |

* cited by examiner

*Primary Examiner* — Sonia Gay
(74) *Attorney, Agent, or Firm* — Edell, Shapiro & Finnan, LLC

(57) ABSTRACT

A conference server is configured to receive audio signals associated with active speakers at separate conference endpoints, and to mix the audio signals to form a mixed audio signal. The conference server is further configured to record a mixed audio track comprising the mixed audio signal, and to determine a relative loudness of each of the active speakers for given periods of time. The conference server is also configured to record a plurality of original audio tracks that each comprises the original voice of one or more of the active speakers before mixing, wherein the original voice recorded in each of the tracks at the given periods of time is based on the relative loudness of the active speakers.

37 Claims, 16 Drawing Sheets

ANALYTIC RECORDING OF CONFERENCE SESSIONS

TECHNICAL FIELD

The present disclosure relates to the recording of conference sessions.

BACKGROUND

There has been an increase in the use of conference sessions (e.g., online audio and/or video conferences) that enable real-time sharing of content between participants (e.g., employees, vendors, clients, etc.) located at physically separate locations. These conference sessions are generally conducted over a wired or wireless computer network (e.g., local area network (LAN), wide area network (WAN), etc.) and a telephone network (e.g., public switched telephone network (PSTN)).

In conventional conference sessions, a single participant controls the session. This participant is sometimes referred to herein as the host participant. The host participant can initiate an audio-video (AV) recording of the conference session. These recordings may then be played back at a later time by, for example, participants who missed the conference.

DESCRIPTION OF EXAMPLE EMBODIMENTS

Overview

Devices, methods and instructions encoded on computer readable media are provided herein for recording a conference session, at least in part, at a conference server hosting a conference session in which a plurality of active speakers each participate at separate conference endpoints. The conference server is configured to receive audio signals associated with each endpoint, select one or more active speakers from the separate conference endpoints, and to mix the audio signals associated with each of the selected active speakers. The conference server is further configured to record a mixed audio track comprising the mixed active speaker audio signals, and to determine a relative loudness of each of the active speakers for given periods of time. The conference server is also configured to record a plurality of original audio tracks that comprise the original voice of one or more of the active speakers before mixing, wherein the original voice recorded in each of the tracks at the given periods of time is based on the relative loudness.

Example Embodiments

Figure 1:
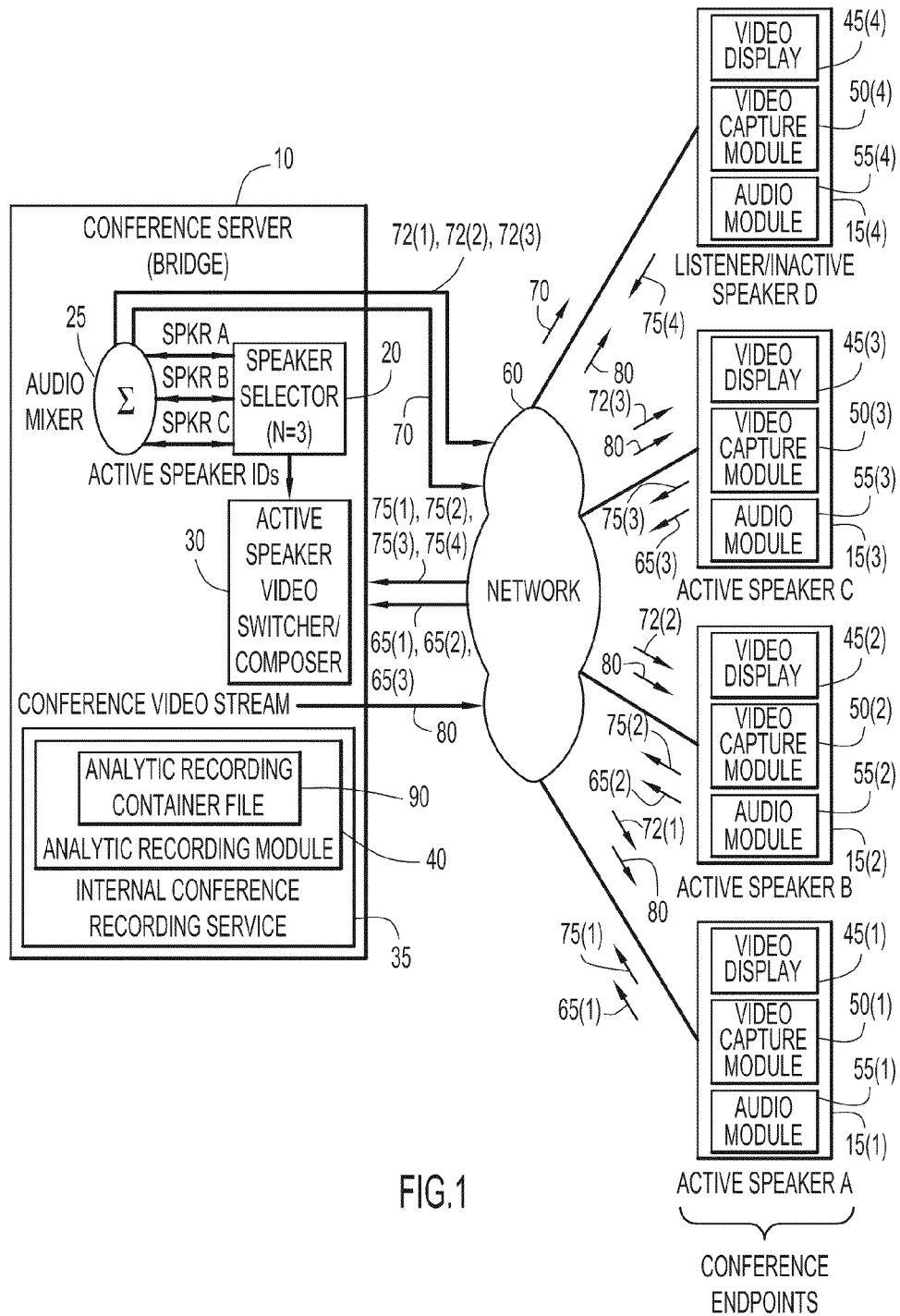
FIG. 1 is a block diagram illustrating a conference server having an analytic recording module that is configured to record a conference session.

FIG. 1 is a block diagram illustrating a conference server 10 hosting a conference session (e.g., an audio conference and/or a video conference) conducted between a plurality of conference endpoints 15(1)-15(4). Conference server 10 comprises a speaker selector 20, an audio mixer 25, an active speaker video switcher/composer 30, and an internal conference recording service 35. Speaker selector 20, audio mixer 25, active speaker video switcher/composer 30, and internal conference recording service 35 may implemented in any combination of hardware and/or software components. Internal conference recording service 35 includes an analytic recording module 40 that is configured to record a conference session in a manner that facilitates subsequent analysis and/or troubleshooting by a technician.

Each conference endpoint 15(1), 15(2), 15(3), and 15(4) comprises a video display 45(1), 45(2), 45(3), and 45(4), respectively, a video capture module 50(1), 50(2), 50(3), and 50(4), respectively, and an audio module 55(1), 55(2), 55(3), and 55(4), respectively. Video displays 45(1)-45(4) may be, for example, the display of a computing device such as a computer (e.g., laptop, desktop, tablet), a mobile phone, a video monitor, etc. Video capture modules 50(1)-50(4)

include a video imaging device (e.g., laptop, desktop, tablet, mobile phone, video camera) and supporting hardware/software to capture the endpoint visual information. Audio modules 55(1)-55(4) comprise, for example, a telephone or components of a computing device configured to capture, transmit, and receive audio signals.

Located at each of the conference endpoints 15(1)-15(4) is a user or conference participant. The participants may be classified as an active speaker (a person who is currently a speaker) or as an inactive speaker (a person who is only listening or a person who is speaking but not selected to participate in the audio conference) during a given period of time. For ease of description, the participants at conference endpoints 15(1), 15(2), and 15(3) are active speakers and are referred to as active speaker A, active speaker B, and active speaker C, respectively. That is, active speaker A is at conference endpoint 15(1), active speaker B is at conference endpoint 15(2), and active speaker C is at conference endpoint 15(3). The participant at conference endpoint 15(4) is an inactive speaker D. Also for ease of description, the conference endpoints 15(1)-15(3) at which active speakers are located are sometimes referred to herein as active endpoints, while the conference endpoint 15(4) at which the inactive speaker is located is sometimes referred to as an inactive endpoint.

A conference session may comprise a video conference and an audio conference, as well as the sharing of documents, images, video, audio and other content among the conference participants. The video conference is an online conference established on a computer network 60 (e.g., a local area network (LAN) or a wide area network (WAN)). The audio conference may also be established on the computer network 60, or, more typically, on a public switched telephone network (PSTN) which is not shown in FIG. 1.

When a conference session is established, audio signals 65(1), 65(2), and 65(3) are sent, via network 60 or a telephone network, to conference server 10 from each of the active endpoints 15(1), 15(2), and 15(3), respectively. No audio signals are sent from inactive endpoint 15(4) because the participant at that endpoint is listening only. The audio signals 65(1)-65(3) are mixed by audio mixer 25 in the conference server 10 to generate a conference mixed audio signal 70 and several additional output audio signals, referred to as partially mixed audio signals 72(1), 72(2), and 72(3), that are tailored for different active speakers so as to avoid echo. More particularly, the conference mixed audio signal 70 comprises the voices of all of the active speakers is sent to inactive speaker D at inactive endpoint 15(4). Partially mixed signals 72(1), 72(2), and 72(3) are sent to each active speaker at conference endpoints 15(1), 15(2), and 15(3), respectively. The partially mixed signal 72(1) comprises a mix of the audio signals 65(1)-65(3) from which the voice of active speaker A has been removed. Similarly, each of the partially mixed signals 72(2) and 72(3) comprise a mix of the audio signals 65(1)-65(3) from which the voice of active speaker B and the voice of active speaker C, respectively, have been removed. In other words, partially mixed signal 72(1) comprises signals 65(2) and 65(3), partially mixed signal 72(2) comprises signals 65(1) and 65(3), and partially mixed signal 72(3) comprises signals 65(1) and 65(2). The mixed audio signal 70 and the partially mixed signals 72(1)-72(3) are sent to each of the conference endpoints 15(1)-15(4) via network 60 or a telephone network.

Similarly, video streams 75(1), 75(2), 75(3), and 75(4) from each of the conference endpoints 15(1), 15(2), 15(3), and 15(4), respectively, are sent, via network 60, to the conference server 10. Active speaker video switcher/composer 30 selects one of these received video streams 75(1)-75(4) corresponding to the loudest active speaker to generate a conference video stream 80 that is sent to each of the conference endpoints 15(1)-15(4) via network 60. The conference video stream 80 may then be displayed at the video displays 45(1)-45(4).

Merely for ease of illustration, the transmission of audio signals 65(1)-65(3) and video signals streams 75(1)-75(4) from the conference endpoints 15(1)-5(4) to the conference server 10 have been omitted from the following FIGS. 2, 5, 7, 9, 10, and 12. Similarly, also for ease of illustration, the transmission of mixed audio signal 70, partially mixed audio signals 72(1)-72(3), and conference video stream 80 from conference server 10 to conference endpoints 15(1)-5(4) have been omitted from the following FIGS. 2, 5, 7, 9, 10, and 12.

Conference server 10 includes a speaker selector 20 that is configured to determine the relative loudness of the active speakers participating in the conference session. That is, with specific reference to FIG. 1, speaker selector 20 is configured to rank the relative loudness of speaker A, speaker B, and speaker C. Speaker selector 20 is also configured to provide active speaker video switcher/composer 30 with active speaker identifiers (IDs) and an indication of the relative loudness ranking for each of the active speakers. The relative loudness is, in other words, an indication of the rank or order of loudness of the active speakers, from loudest to the softest/quietest or vice versa.

In operation, the conference video stream 80 generated by active speaker video switcher/composer 30 will be the video captured from the conference endpoint having the loudest speaker during a given period of time. For example, active speaker video switcher/composer 30 will receive an indication from the speaker selector 20 that speaker A is the loudest speaker during a first time period. As such, during that first time period, the conference video stream 80 will comprise the video stream 75(1) (i.e., the video stream captured at conference endpoint 15(1) where speaker A is located). Active speaker video switcher/composer 30 may then receive an indication that speaker B is the loudest speaker during a second time period. As such, during this second time period, the conference video stream 80 will comprise the video stream 75(2) (i.e., the video stream captured at conference endpoint 15(2) where speaker B is located). This process may continue throughout the conference session. Because conference video stream 80 corresponds to the video captured from the loudest speaker's endpoint, this video stream is also referred to herein as the loudest speaker video stream.

The participant that controls the conference session, also referred to as the host participant, can initiate an audio-visual (AV) recording of the conference session. These recordings are, in this example, generated by internal conference recording server 35. These recordings may be played back at a later time by, for example, participants who missed the conference or by technicians troubleshooting a media issue. In the conventional recording process, a recording is made of the mixed audio signal 70 and the loudest speaker video stream 80. Although these two recordings are sufficient for a participant who missed the conference, these recordings are not adequate for use by technicians or other support personnel who need to troubleshoot audio/video issues that arise during a conference. In particular, conference sessions often suffer from audio or video quality issues caused by a one or more network or equipment issues. The conference host or a participant can contact a technician to troubleshoot the media quality issues, but in many cases this contact occurs after the meeting concludes. In these cases, the technician relies on any available meeting recordings and logs to troubleshoot the issue. However, due to inadequate or missing data the current conference recordings and logs are generally inadequate to quickly and effectively find the root cause of a problem.

Issues that may require troubleshooting include, but are not limited to, echoes, unexpected noises, loss of sound for a period of time, poor voice quality, etc. Each of these issues may have different root causes that include, for example, network related issues (e.g., packet loss or packet delay), audio or video encoder/decoder related issues within the conference server or the endpoint, local conferencing system related issues, issues related to an external conference recorder, if used, etc. The conventional mixed audio recording and loudest speaker video recording include only the captured payload, and do not provide any means by which a technician can isolate and identify the source of the problem. Accordingly, included in internal conference recording server 35 is an analytic recording module 40 that is configured to generate an analytic recording container file 90. Analytic recording container file 90 includes a collection of one or more new recordings (tracks) that provide a technician with the information needed to analyze and troubleshoot issues identified during a recorded conference session. As described below, there may be a variety of new recordings and the analytic recording container file may have a number of different formats.

Figure 2:
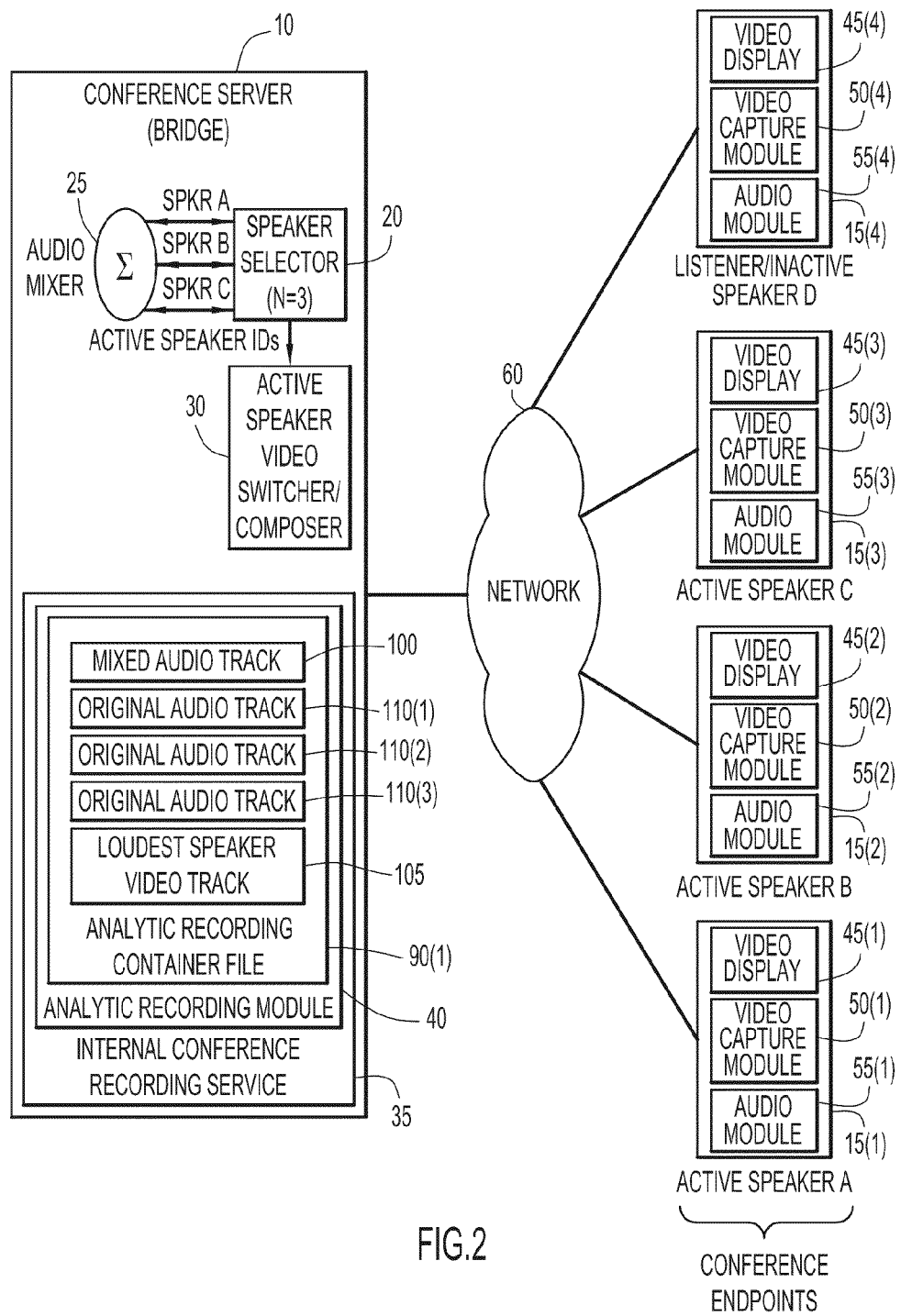
FIG. 2 is a block diagram illustrating an example in which the conference server is configured to record a mixed audio track and a plurality of original audio tracks.

FIG. 2 is a block diagram illustrating one example configuration of analytic recording module 40 and one example resulting analytic recording container file 90(1). As noted above, audio signals 65(1), 65(2), and 65(3) are received from conference endpoints 15(1), 15(2), and 15(3), respectively. These audio signals are mixed by audio mixer 25 to generate mixed audio signal 70. Analytic recording module 40 is configured to record this mixed audio signal into a mixed audio track 100 that is added to analytic recording container file 90(1).

Additionally, the video streams 75(1)-75(4) are received by conference server 10 and used by active speaker video switcher/composer 30 to generate conference video stream 80. As noted above, conference video stream is a stream of the video captured at the endpoint of the loudest speaker during a given period of time (loudest speaker video stream). Analytic recording module 40 is configured to record a video track 105 that comprises the loudest speaker video stream. This video track 105 is sometimes referred to herein as the loudest speaker video track 105.

To assist a technician in troubleshooting audio quality problems that arise during a recorded conference session, analytic recording module 40 is further configured to record a plurality of original audio tracks 110(1)-110(3). In this example, the number of original audio tracks 110(1)-110(3) is the same as the number of active speakers (i.e., 3 active speakers and 3 original audio tracks). The original audio tracks 110(1)-110(3) each comprise the original voice of one or more of the active speakers, prior to the mixing at audio mixer 25. That is, the original audio tracks 110(1)-110(3) comprise one or more portions of the audio signals 65(1), 65(2), and 65(3) received from conference endpoints 15(1), 15(2), and 15(3), respectively.

In one example, speaker selector 20 is configured to evaluate the audio signals 65(1), 65(2), and 65(3) to determine the relative loudness of the active speakers at the active conference endpoints 15(1), 15(2), and 15(3) during given periods of time. Speaker selector 20 may rank the relative loudness of the active speakers such that, during given periods of time, a first active speaker is designated (ranked) as the loudest speaker, a second active speaker is designated as the second loudest speaker, and a third active speaker is designated as the third loudest speaker. The relative loudness (and thus these designations) may change for subsequent time periods. In operation, the audio signals 65(1)-65(3), as well as indications of the relative loudness rankings, are provided to analytic recording module 40.

Using the relative loudness indications and the audio signals 65(1)-65(3), analytic recording module 40 records original audio track 110(1) that comprises the original voice (i.e., premixing audio signals) of the loudest speaker during given periods of time. Additionally, analytic recording module 40 is configured to record original audio track 110(2) that comprises the original voice of the second loudest speaker during the given periods of time, and original audio track 110(3) that includes the original voice of the third loudest speaker during the given periods of time.

Figure 3:
FIG. 3 is a schematic diagram illustrating the content of the original recorded audio tracks during given periods of time in accordance with the example of FIG. 2.

As noted above, the loudest speaker, as well as the relative loudness rankings of the speakers, may change in subsequent time periods. For example, during a first time period speaker A is designated the loudest speaker, speaker B is designated the second loudest speaker, and speaker C is designated the third loudest speaker. In a next time period, speaker A is designated the loudest speaker, speaker C is designated the second loudest speaker, and speaker B is designated the third loudest speaker. As such, each of the original audio tracks 110(1)-110(3) may include the original voices of different speakers in different time periods. FIG. 3 is a schematic drawing illustrating one example of five time periods 115(1)-115(5) and the content (with reference to the associated speaker) of original audio tracks 110(1)-110(3) during these time periods.

Figure 4A:
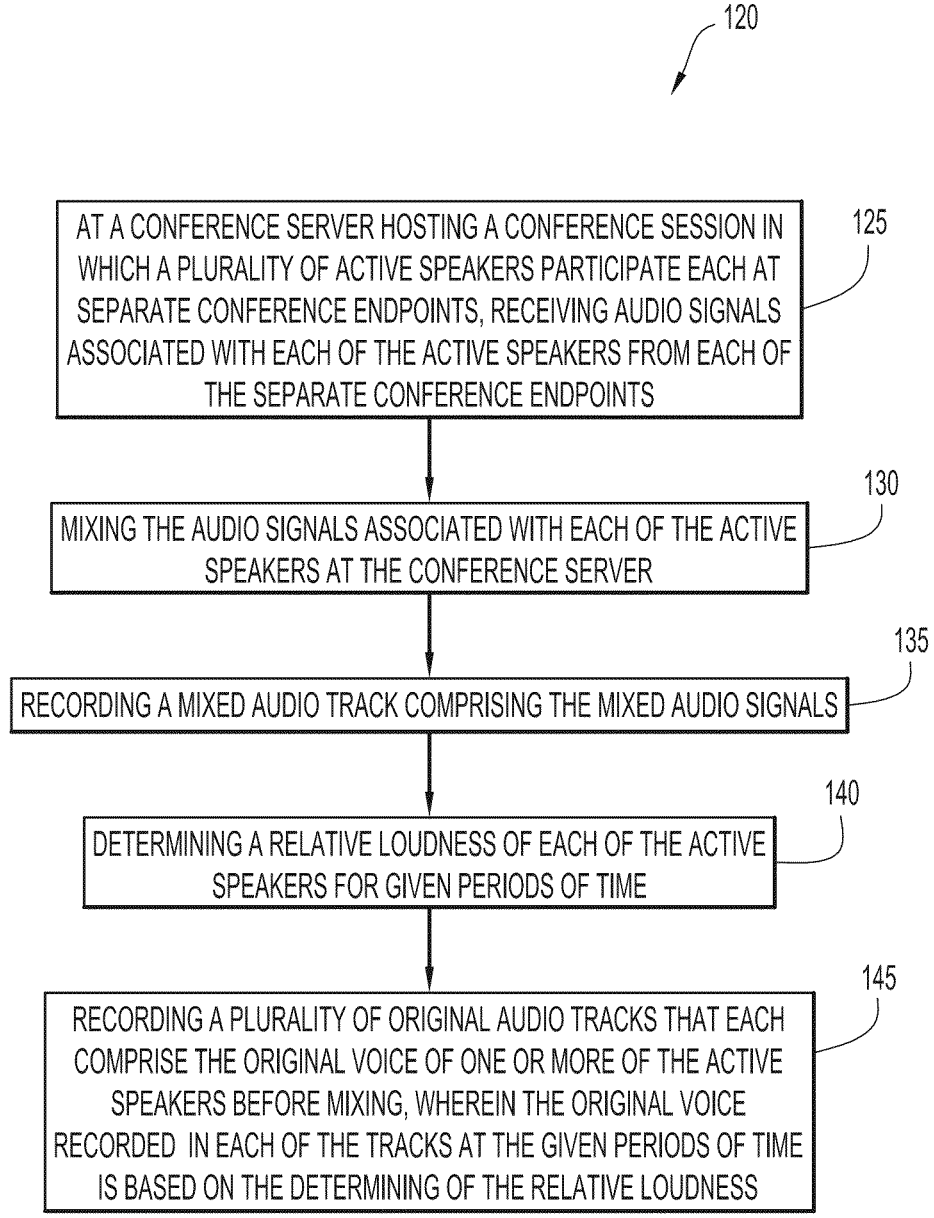
FIG. 4A is a high-level flowchart illustrating the operations of the conference server to generate the mixed audio track and the plurality of original audio tracks.

FIG. 4A is a high-level flowchart of a method 120 executed at conference server 10 to generate the mixed audio track 100 and the plurality of original audio tracks 110(1)-110(3). Method 120 begins at 125 wherein audio signals 65(1)-65(3) associated with the active speakers at the conference endpoints 15(1)-15(3) are received at the conference server 10. At 130, the audio signals 65(1)-65(3) are mixed together (at audio mixer 25) to generate mixed audio signal 70. At 135, a mixed audio track 100 that comprises the mixed audio signals is recorded and added to analytic recording container file 90. At 140, the relative loudness of each of the active speakers at conference endpoints 15(1)-15(3) is determined. At 145, a plurality of original audio tracks 110(1)-110(3) is recorded. The original audio tracks 110(1)-110(3) each comprise the original voice of one or more of the active speakers before mixing. The original voice recorded in each of the original audio tracks 110(1)-110(3) at given periods of time is based on the relative loudness of the active speakers made at 140.

Figure 4B:
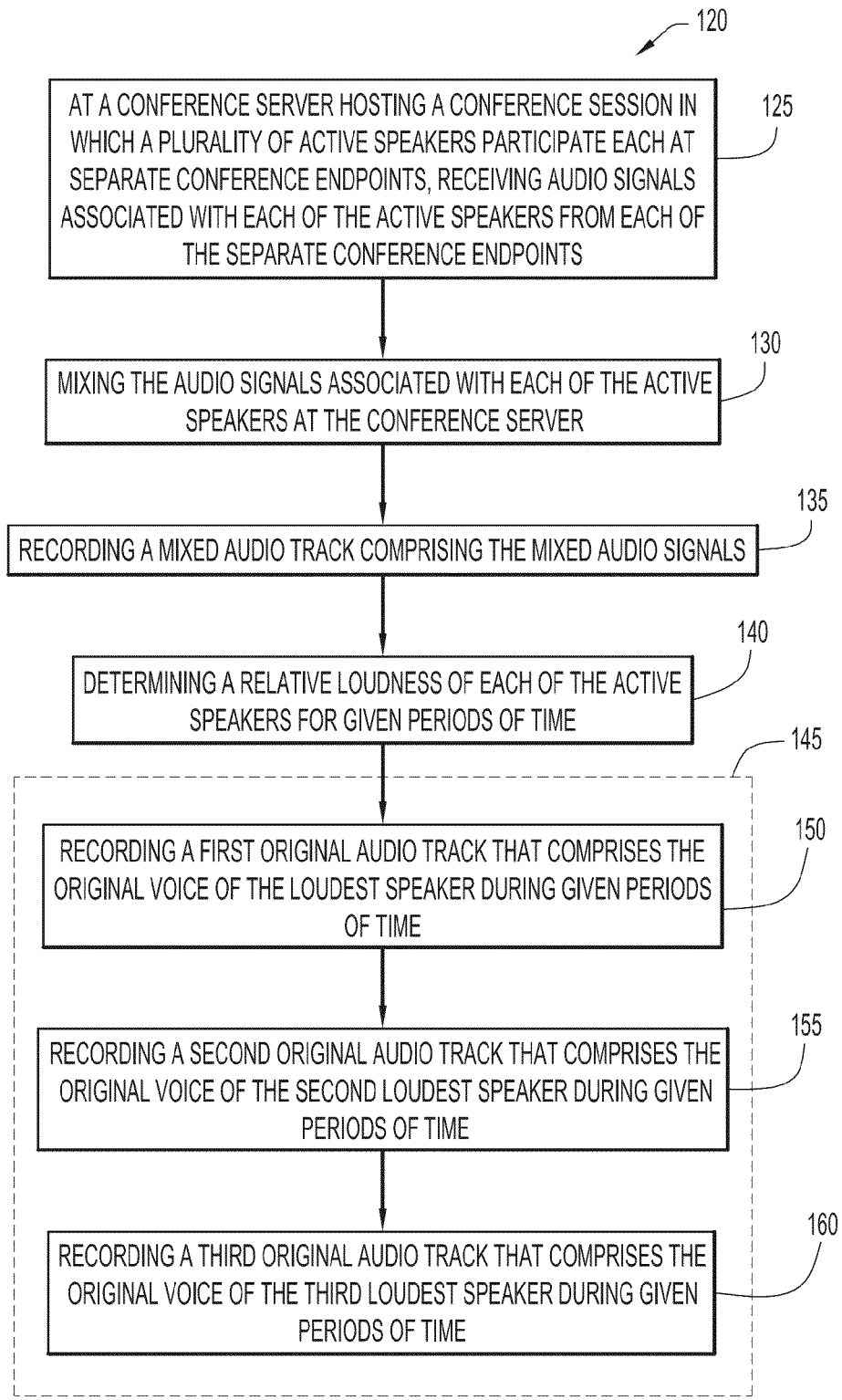
FIG. 4B is a flowchart illustrating further details of the operations of the conference server to generate the original audio tracks.

FIG. 4B is a flowchart illustrating further details of the recording of the original audio tracks in method 120. More specifically, in this example, step 145 of FIG. 4A comprises three sub-steps 150, 155, and 160. At 150, the first original audio track 110(1) is recorded that comprises the original voice of the loudest speaker during the given periods of time. At 155, the second original audio track 110(2) is recorded that comprises the original voice of the second loudest speaker during the given periods of time. Finally, at 160, the third original audio track 110(3) is recorded that comprises the original voice of the third loudest speaker during the given periods of time.

In the examples of FIGS. 2-4B the content of the original audio tracks 110(1)-110(3) is based on the relative loudness of the various active speakers at any given time. In an alternative example, each original audio track 110(1)-110(3) corresponds directly to a single active speaker. For example, in such arrangements original track 110(1) may include the original voice of speaker A (regardless of the relative loudness of speaker A), original track 110(2) may include the original voice of speaker B (regardless of the relative loudness of speaker B), and original track 110(3) may include the original voice of speaker C (regardless of the relative loudness of speaker C).

Figure 5:
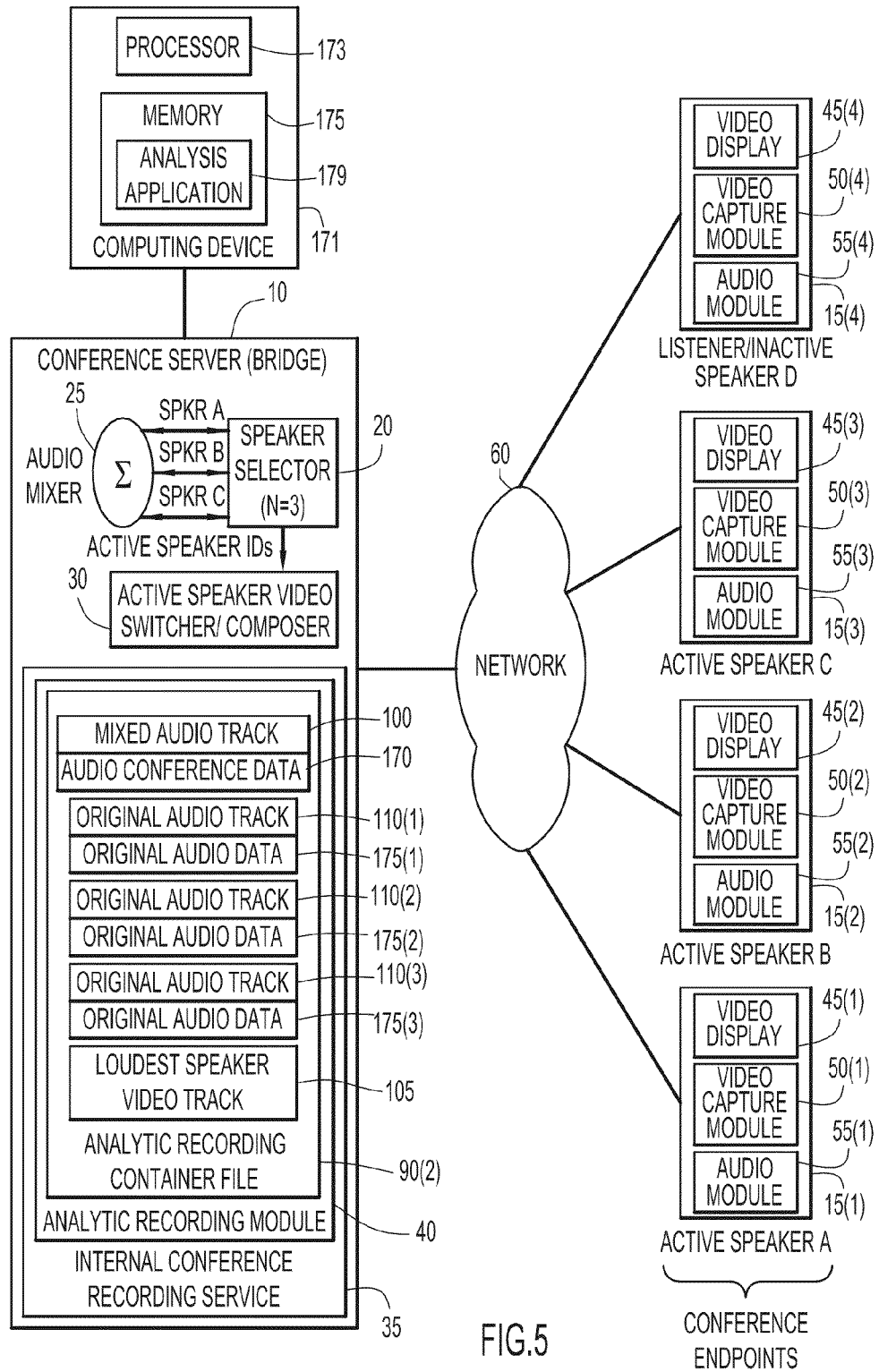
FIG. 5 is a block diagram illustrating an example in which the conference server is configured to record data associated with the mixed audio track and the plurality of original audio tracks.

FIG. 5 is a block diagram illustrating another example configuration of analytic recording module 40 and a resulting container analytic recording container file 90(2). Similar to the example of FIG. 2, container file 90(2) includes the mixed audio track 100, loudest speaker video track 105, and original audio tracks 110(1)-110(3). Each of these audio/video tracks are recorded as described above.

In this example, analytic recording module 40 is further configured to associate real-time and dynamic data with each of the recorded audio tracks. More specifically, associated with mixed audio track 100 is audio conference data track 170 containing real-time dynamic data that is synchronized to the audio signals. For example, the mixed recording data 170 may comprise the energy levels of the voices being mixed, active speaker identification information, protocol information, packet media statistics, and/or participant information. This data can help technicians troubleshoot media problems and isolate which endpoint or link may have caused the problem.

Additionally, analytic recording module 40 is configured to associate original audio data 175(1), 175(2), and 175(3) with each of the original audio tracks 110(1), 110(2), and 110(3), respectively. The original audio data 175(1), 175(2), and 175(3) may be used to identify network related issues or associate specific sources with an identified issue. In one example, the original audio data 175(1)-175(3) may comprise Real-time Transport Protocol (RTP) information such as local and remote Internet Protocol (IP) addresses, RTP ports, time stamps, synchronization source identifiers (SSRCs), sequence numbers, payloads, etc. of the audio signals 65(1)-65(3). In another example, the original audio data 175(1)-175(3) may comprise media data, such as jitter information, frame rate/sizes, bit rates, or other media related parameters of the audio signals 65(1)-65(3). In still another example, the original audio data 175(1)-175(3) may comprise participant information, such as participant identifiers, session identifiers, channel/stream identifiers, caller identifier/name, endpoint information, etc., of the audio signals 65(1)-65(3).

It will be appreciated that similar to the content of the original audio tracks 110(1)-110(3), the original audio data 175(1)-175(3) will also correspond to the speaker recorded during given periods of time. In other words, the associated original audio data will be synchronized with the recorded speaker.

The association of the real-time or dynamic data with the original active speaker voice tracks and the mixed audio track provides a self-contained tool that may be used by technicians to quickly analyze, debug, and troubleshoot AV quality issues. By inspecting the different recording files, technicians can easily analyze and isolate which segment of the conference recording system is responsible for the quality issue.

In one example, a user-friendly analysis application can be devised that reads the real-time and dynamic data of the recordings, plays back the audio and video tracks, and displays relevant quality and network impairment information to a technician. This analysis application may be executed at a computing device connected (wired or wirelessly) to conference server 10. The analysis application allows a technician to analyze the recorded tracks to identify an audio or video quality issue detected during the conference session. This identification may include determining the source and/or the cause of the identified audio or video quality issue.

An example computing device 171 having an analysis application 179 is shown in FIG. 5. Computing device 171 comprises a processor 173 and a memory 175 in which analysis application 179 may be stored. Memory 175 may comprise read only memory (ROM), random access memory (RAM), magnetic disk storage media devices, optical storage media devices, flash memory devices, electrical, optical, or other physical/tangible memory storage devices. Processor 174 may be, for example, a microprocessor or a microcontroller, that executes instructions for the analysis application 179. Thus, in general, the memory 175 may comprise one or more tangible (non-transitory) computer readable storage media (e.g., a memory device) encoded with software comprising computer executable instructions and when the software is executed (by the processor 173) it is operable to perform the operations described herein in connection with analysis application 179.

Figure 6:
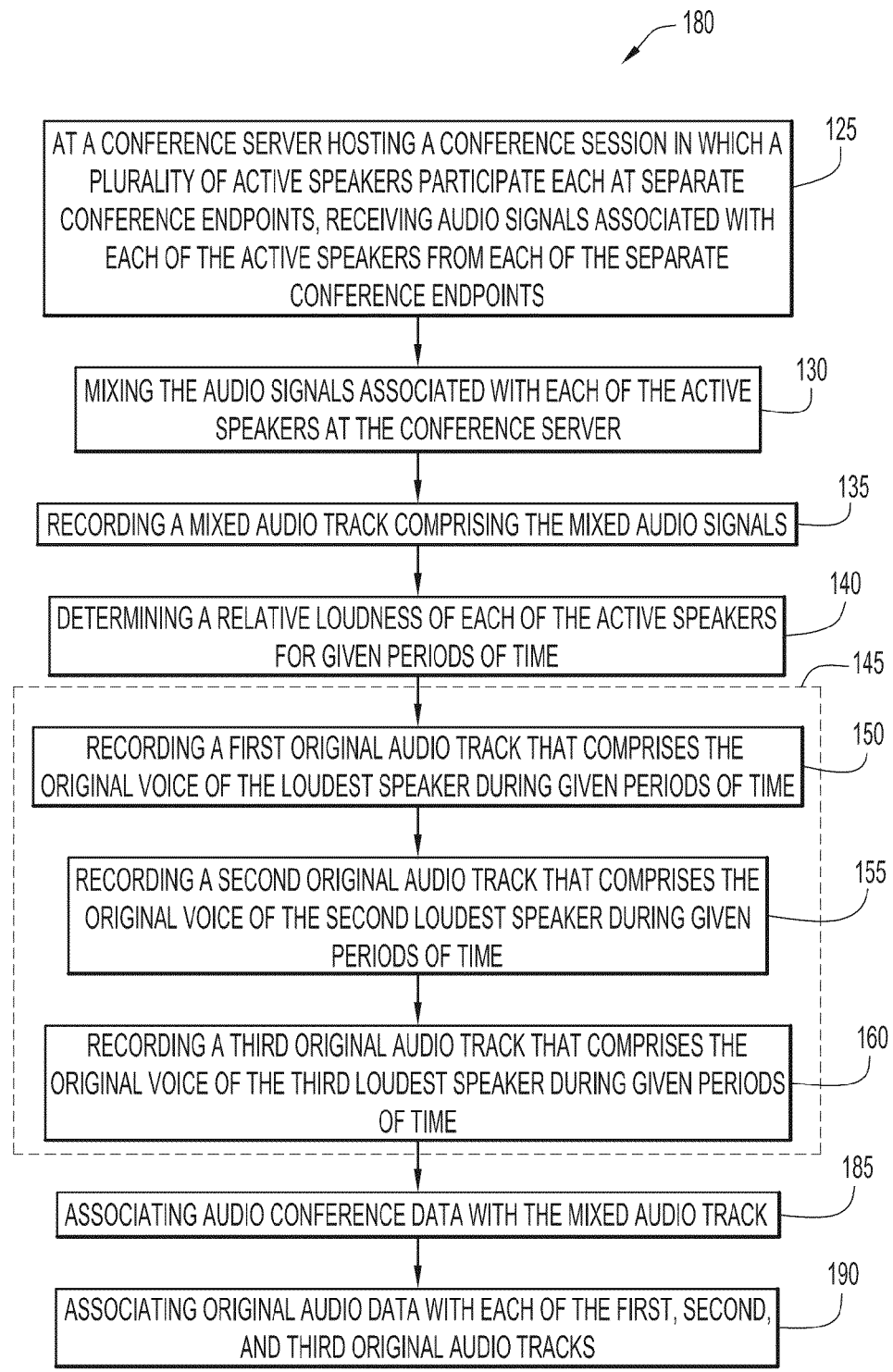
FIG. 6 is a flowchart illustrating operations of the conference server to record data associated with the mixed audio track and the plurality of original audio tracks.

FIG. 6 is a flowchart of a method 180 executed in accordance with the embodiments of FIG. 5. Method 180 includes the operations 125, 130, 135, 140, 145 (including sub-steps 150, 155, and 160) as described above with reference to FIG. 4B. In addition, at 185, mixed recording data 170 is associated with mixed audio track 100. Similarly, at 190, original audio data 175(1), 175(2), and 175(3) is associated with each of the original audio tracks 110(1), 110(2), and 110(3, respectively.

Figure 7:
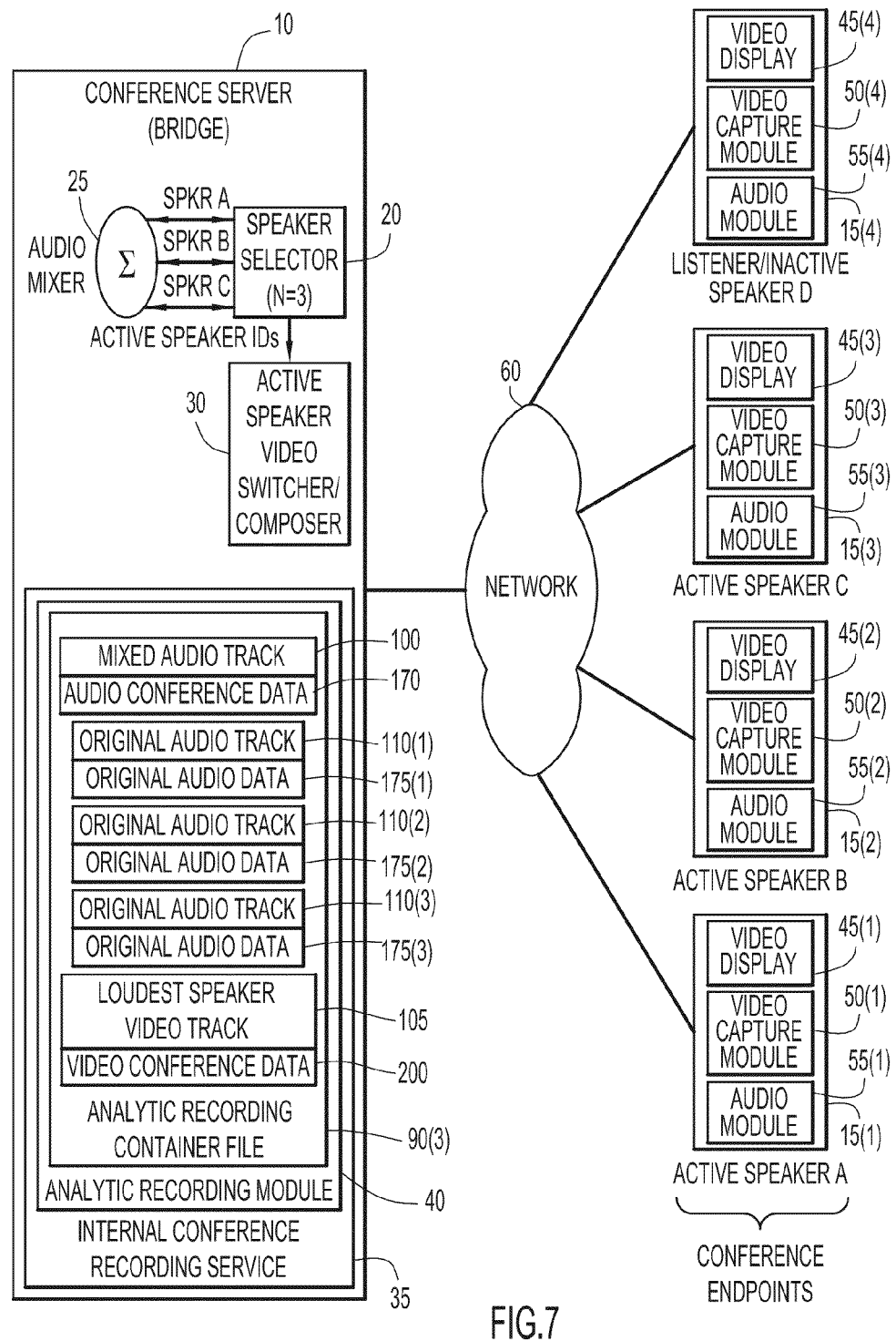
FIG. 7 is a block diagram illustrating an example in which the conference server is configured to associate video data with a recorded video track.

FIG. 7 is a block diagram illustrating another example configuration of analytic recording module 40 and a resulting container analytic recording container file 90(3). Similar to the example of FIG. 5, analytic recording container file 90(3) includes the mixed audio track 100, loudest speaker video track 105, and original audio tracks 110(1)-110(3). Each of these audio/video tracks are recorded as described above. Additionally, associated with mixed audio track 100 is mixed recording data 170, and associated with original audio tracks 110(1), 110(2), and 110(3) is original audio data 175(1), 175(2), and 175(3), respectively.

In this example, analytic recording module 40 is further configured to associate real-time and dynamic video data 200 with the loudest speaker video track 105. This data, referred to as video recording data, may comprise RTP information, media information, and/or participant information for the received video signals 75(1)-75(3) that are combined to form conference video stream 80.

Figure 8:
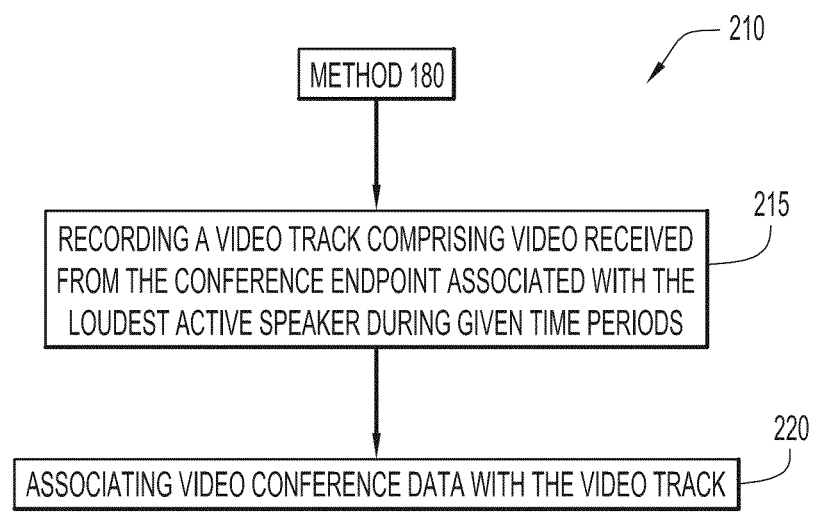
FIG. 8 is a flowchart illustrating the operations of the conference server to associate the video data with the recorded video track.

FIG. 8 is a flowchart of a method 210 executed in accordance with the embodiments of FIG. 7. Method 210 includes the operations of method 180, as described above reference to FIG. 6, and the additional steps 215 and 220. At 215, a video track 105 is recorded. The video track 105 comprises the video received from the conference endpoint associated with the loudest active speaker during given periods of time and is referred to above as the loudest video track 105. At 220, video conference data 200 is associated with the video track 105.

The examples of FIGS. 7 and 8 illustrate the recording of a loudest speaker video track 105 that includes the video captured at the endpoint of the loudest active speaker during given time periods. In other examples, the conference server 10 is configured to record video tracks, referred to herein as original video tracks, that are each associated with one of the active speakers during a given period of time. These original video tracks may be recorded instead of, or in addition to, the loudest active speaker track 105.

Figure 9:
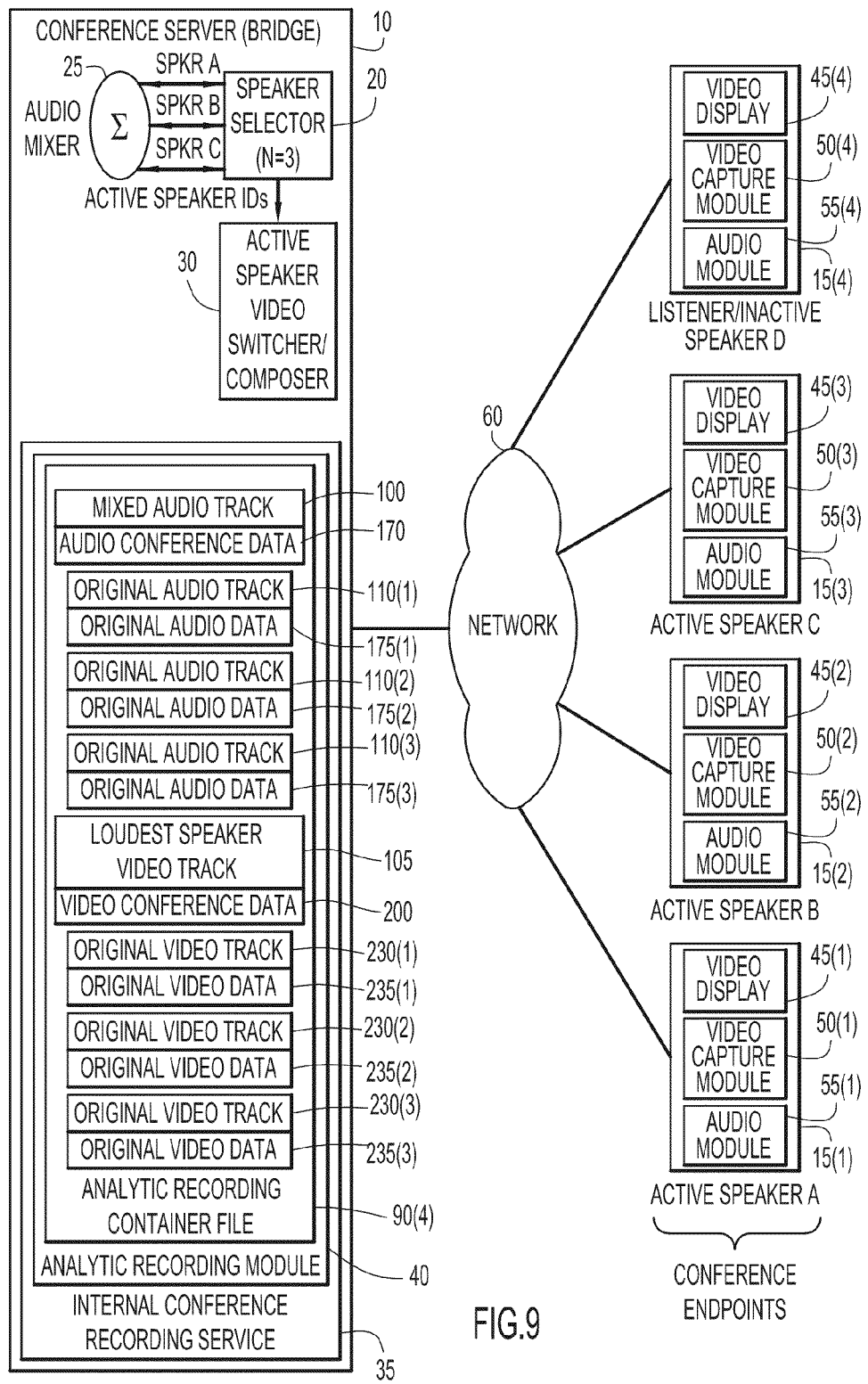
FIG. 9 is a block diagram illustrating an example in which the conference server is configured to record a plurality of original video tracks and to associate video data with each of the original video tracks.

FIG. 9 is a block diagram in which analytic recording module 40 is configured as described above with reference to FIG. 7, but is also further configured to record original video tracks 230(1), 230(2), and 230(3) for each of the active speakers A, B, and C, respectively. That is, analytic recording module 40 is configured to separately record the video signals 75(1)-75(3) and add these tracks to an analytic container file 90(4). Analytic recording module 40 is also configured to associate video recording data 235(1), 235(2), and 235(3) with the original video tracks 230(1), 230(2), and 230(3), respectively.

It will be appreciated that the above examples generally refer to approaches in which the conference session recording occurs at the conference server 10. The following description refers to examples in which an external recording server is also provided to perform conference recording functions.

Figure 10:
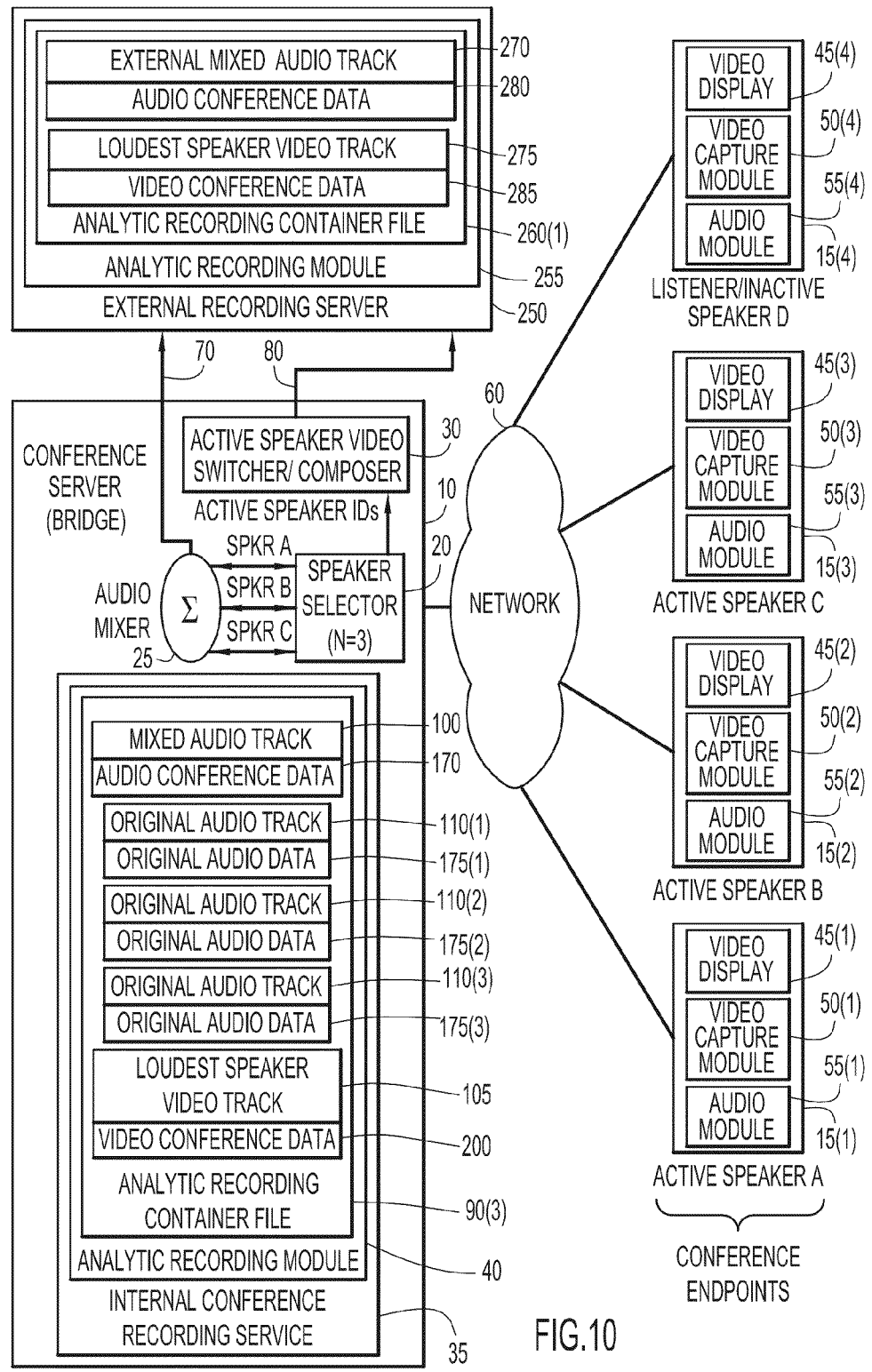
FIG. 10 is a block diagram illustrating an example in which the conference server operates with an external recording server configured to record an external mixed audio track and an external video track, as well as to associate data with one or more of the external audio and video tracks.

More specifically, FIG. 10 is a block diagram in which an external recording server 250 cooperates with conference server 10 to record a conference session in a manner that facilitates subsequent analysis by a technician. In this example, conference server 10 is configured as described above with reference to FIG. 7 to generate an analytic recording container file 90(3). That is, analytic recording module 40 is configured to record a mixed audio track 100, a loudest speaker video track 105, and original audio tracks 110(1)-110 (3). Analytic recording module 40 is further configured to associate mixed recording data 170 with the mixed audio track 100, associate original audio data 175(1), 175(2), and 175(3) with original audio tracks 110(1), 110(2), and 110(3), respectively, and associate video recording data 200 with loudest speaker video track 105. It will be appreciated that, in alternative arrangements, conference server 10 and analytic recording module 40 may be configured in accordance with any of the examples of FIGS. 2-6 to generate different analytic recording container files (e.g., container files 90(1), 90(2) or 90(4)).

External recording server 250 comprises an analytic recording module 255 that is configured to generate an analytic recording container file 260(1) by recording one or more audio and/or video tracks. More specifically, conference server 10 is configured to send the mixed audio signal 70 and the conference video stream 80 to external recording server 250. Analytic recording module 255 is configured to record the received mixed audio signal as an external mixed audio track 270 that is added to analytic recording container file 260(1). Analytic recording module 255 is also configured to record the received conference video stream 80 as an external loudest speaker video track 275.

Analytic recording module 255 is also configured to associate real-time and dynamic data with each of the audio/video tracks recorded at external recording server 250. More specifically, associated with mixed audio track 270 is audio conference data 280. The audio conference data 280 is obtained at external recording server 250 and may comprise, for example, statistical data specific to the network connection between the conference server 10 and recording server 250, conference energy levels of the voices being mixed, active speaker identification information, protocol information, packet media statistics, and/or participant information. This data can help technicians troubleshoot conference media problems and isolate which endpoint or link may have caused the problem, as well as to determine if the link between the conference server 10 and recording server 250 contributed to or caused the issues.

Additionally, associated with loudest speaker video track 275 is video conference data 285. Video conference data is generated at external recording server 250 and may comprise, for example, RTP information, participant information, media information, etc.

Figure 11:
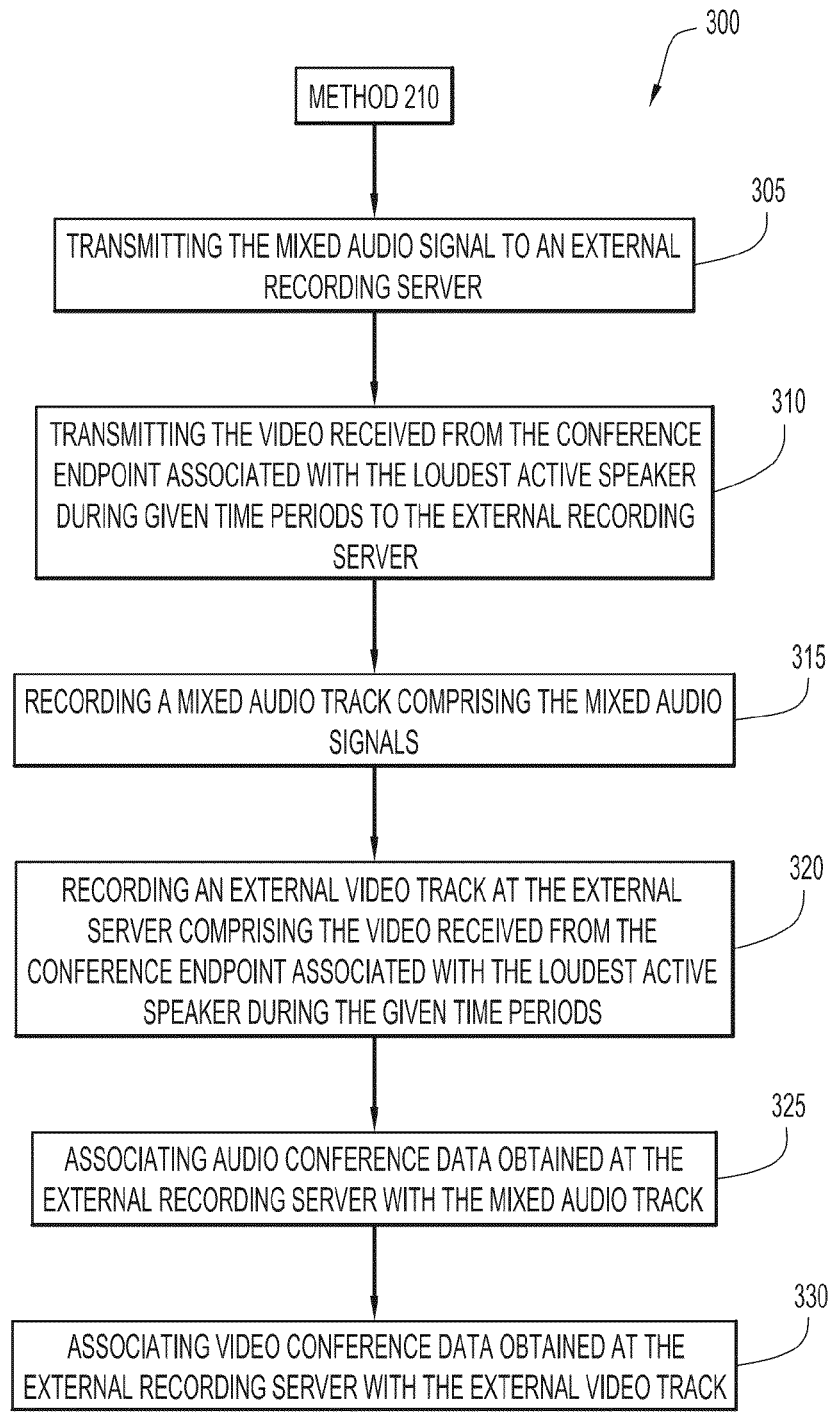
FIG. 11 is a flowchart illustrating the operations of the conference server and the external recording server to record the external mixed audio track and the external video track, as well as to associate data with one or more of the external audio and video tracks.

FIG. 11 is a flowchart of a method 300 executed in accordance with the example of FIG. 10. Method 300 includes the operations method 210, as described above with reference to FIG. 8, and additional steps 305, 310, 315, 320, 325, and 330. At 305, the mixed audio signal 70 is transmitted from the conference server 10 to the external recording server 250. Similarly, at 310 the video received from the conference endpoint associated with the loudest active speaker during given time periods is also transmitted from the conference server 10 to the external recording server 250. That is, the conference video stream 80 is transmitted to the external recording server 250.

At 315, an external mixed audio track 270 comprising the mixed audio signal 70 is recorded at the external recording server 250. At 320, an external video track (external loudest speaker video track 275) comprising the video received from the conference endpoint associated with the loudest active speaker during given time periods is also recorded at the external recording server 250. At 325, audio conference data 280 obtained at the external recording server 250 is associated with the mixed audio track 270. At 330, video conference data 285 obtained at the external recording server 250 is associated with the external video track 275.

Figure 12:
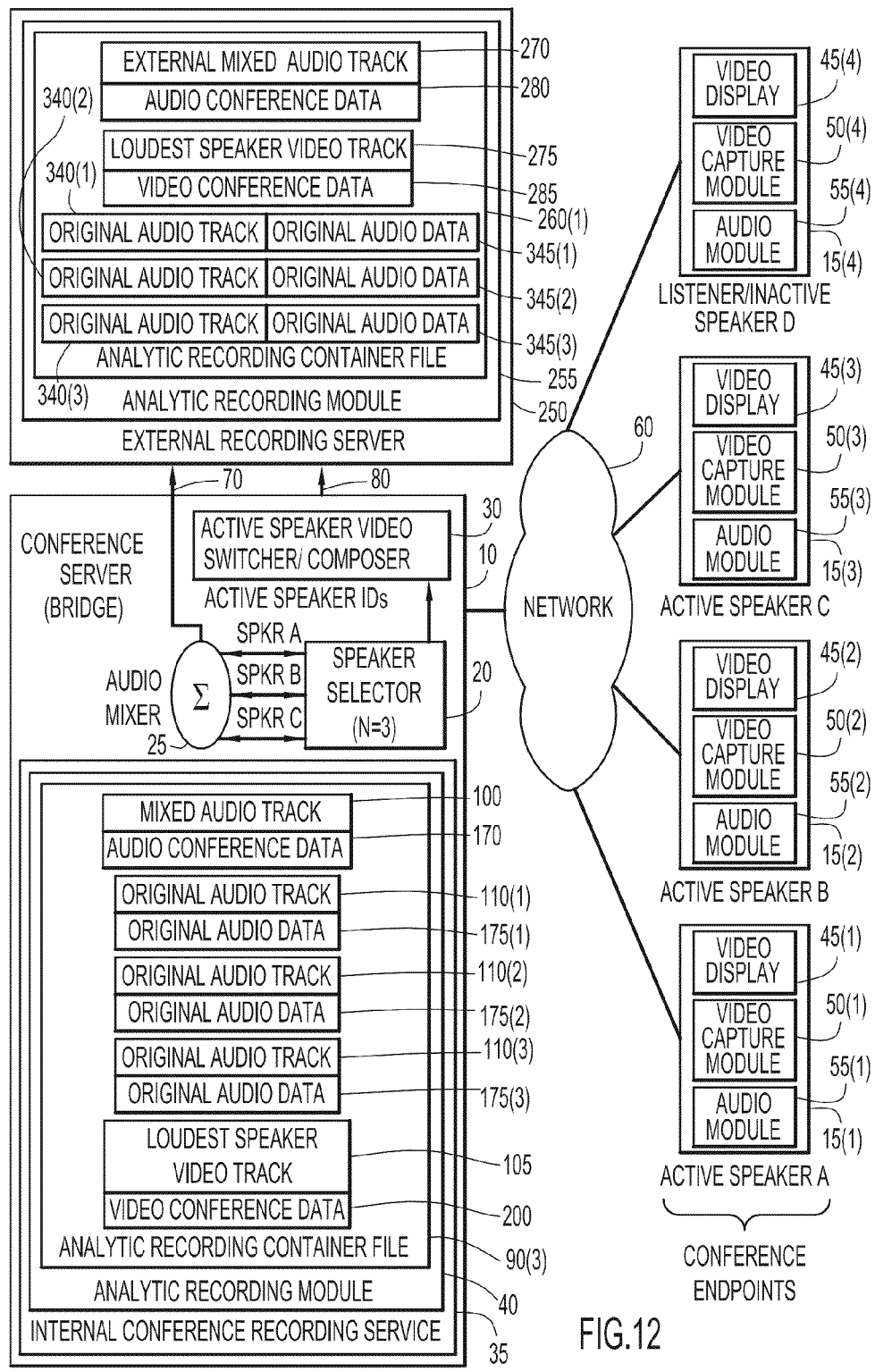
FIG. 12 is a block illustrating one example in which the conference server operates with an external recording server further configured to record a external mixed audio track, a plurality of external original audio tracks, and an external video track, and to associate data with the external mixed audio track, the original audio track, and the external video track.

FIG. 12 is a block diagram illustrating an alternative configuration of conference server 10, external recording server 250, and analytic recording module 255. In this example, conference server 10 is further configured to transmit the original audio signals 65(1), 65(2), and 65(3) received from conference endpoints 15(1), 15(2), and 15(3), respectively, to external recording server 250. For ease of illustration, the transmission of these original audio signals 65(1), 65(2), and 65(3) to the external recording server 250. Analytic recording module 255 is configured to record a plurality of external original audio tracks 340(1)-340(3). In this example, the number of external original audio tracks 340(1)-340(3) is the same as the number of active speakers (i.e., 3 active speakers and 3 original audio tracks). The external original audio tracks 340(1)-340(3) each comprise the original voice of one or more of the active speakers prior to the mixing at audio mixer 25. That is, the original audio tracks 340(1)-340(3) comprise one or more portions of the audio signals 65(1), 65(2), and 65(3) received from active conference endpoints 15(1), 15(2), and 15(3), respectively. Similar to the above examples, these original audio tracks 340(1), 340(2), and 340(3) may include the original voice of the first, second, and third loudest speakers during given periods of time, respectively, or these original audio tracks may each correspond to a single active speaker. These different tracks are stored in analytic recording container file 260(2).

Additionally, external recording server 250 may also be configured to associate original audio data 345(1), 345(2), and 345(3) with each of the external original audio tracks 340(1), 340(2), and 340(3), respectively. The original audio data 345(1), 345(2), and 345(3) is obtained at external recording server 250 and may comprise, for example, statistics data specific to the network connection between the conference server 10 and recording server 250, or data similar to the example of FIG. 5 (e.g., energy levels of each voices, protocol information, packet media statistics, and/or participant information).

Figure 13:
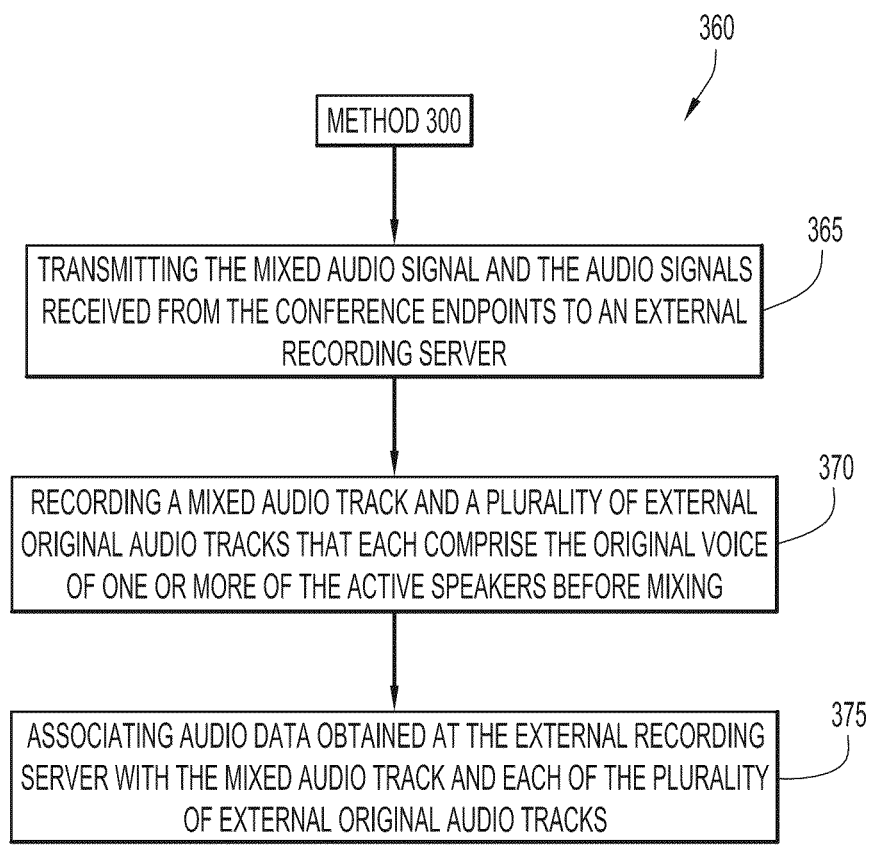
FIG. 13 is a flowchart illustrating operations of the conference server and the external recording server to record the mixed audio track, the plurality of external original audio tracks, and the external video track, and to associate data with the external mixed audio track, the original audio track, and the external video track.

FIG. 13 is a flowchart of a method 360 executed in accordance with the example of FIG. 12. Method 360 includes the operations of method 300, as described above with reference to FIG. 11, and additional operations 365, 370, and 375. At 365, the audio signals 65(1), 65(2), and 65(3) received from the conference endpoints 15(1), 15(2), and 15(3), respectively, are transmitted from the conference server 10 to the external recording server 250. At 370, a plurality of external original audio tracks 340(1)-340(3) that each comprise the original voice of one or more of the active speakers before mixing is recorded at the external recording server 250. The content of these external original tracks 340(1)-340(3) may be, in certain examples, based on a determination of relative loudness of the active speakers. At 375, the original audio data 345(1)-345(3) that is obtained at the external recording server 250 is associated with each of the plurality of external audio tracks 340(1)-340(3).

Figure 14:
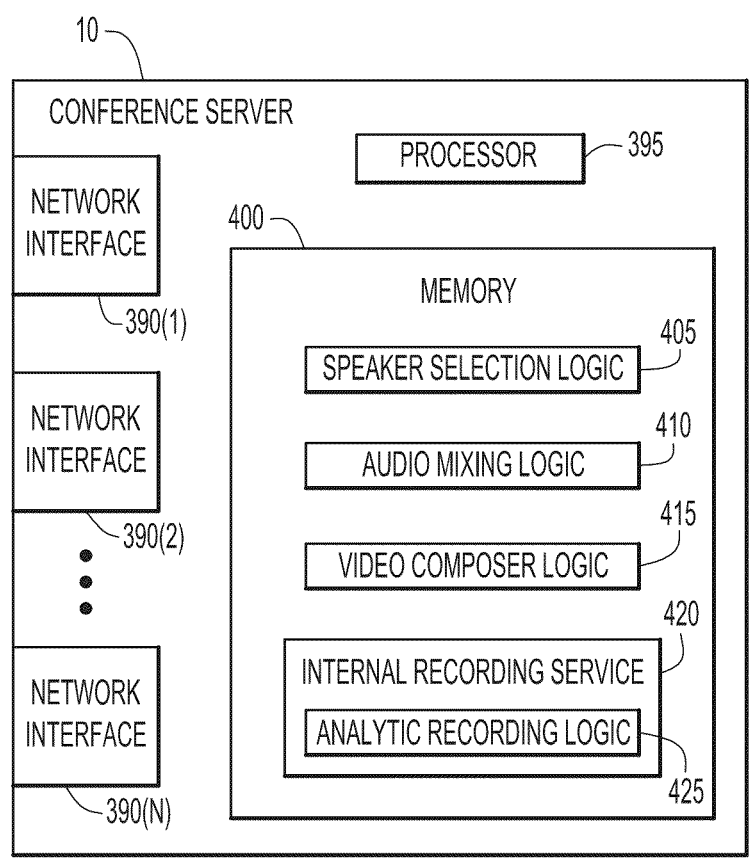
FIG. 14 is a block diagram illustrating one example implementation of the conference server.

FIG. 14 is a block diagram illustrating one example configuration of conference server 10. As shown, conference server 10 includes a plurality of network interfaces 390(1)-390(N), a processor 395, and a memory 400. Memory 400 comprises speaker selection logic 405, audio mixing logic 410, active speaker video switcher/composer logic 415, and internal recording service 420. Internal recording server 420 comprises analytic recording logic 425.

Memory 400 may comprise read only memory (ROM), random access memory (RAM), magnetic disk storage media devices, optical storage media devices, flash memory devices, electrical, optical, or other physical/tangible memory storage devices. The processor 395 is, for example, a microprocessor or microcontroller that executes instructions for the speaker selection logic 405, audio mixing logic 410, active speaker video switcher/composer logic 415, and analytic recording logic 425. Thus, in general, the memory 400 may comprise one or more tangible (non-transitory) computer readable storage media (e.g., a memory device) encoded with software comprising computer executable instructions and when the software is executed (by the processor 395) it is operable to perform the operations described herein in connection with speaker selector 20 (through execution of speaker selection logic 405), audio mixer 25 (through execution of audio mixing logic 410), active speaker video switcher/composer 30 (through execution of active speaker video switcher/composer logic 415), and analytic recording module 40 (through execution of analytic recording logic 425).

FIG. 14 illustrates an example of a primarily software implementation of conference server 10. It will be appreciated that in alternative examples the speaker selection logic 405, audio mixing logic 410, active speaker video switcher/composer logic 415, and analytic recording logic 425 may be implemented, at least in part, with digital logic gates in one or more application-specific integrated circuits (ASICs).

Figure 15:
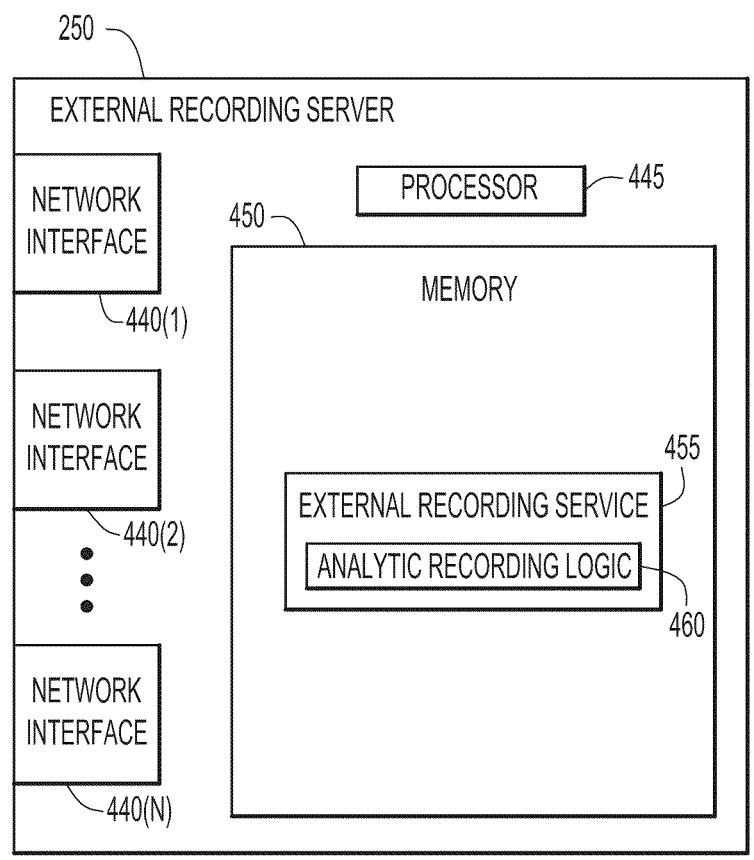
FIG. 15 is a block diagram illustrating one example implementation of the external recording server.

FIG. 15 is a block diagram illustrating one example configuration of external recording server 250. As shown, external recording server 250 includes a plurality of network interfaces 440(1)-440(N), a processor 445, and a memory 450. Memory 450 comprises speaker external recording service 455 that includes analytic recording logic 460.

Memory 450 may comprise ROM, RAM, magnetic disk storage media devices, optical storage media devices, flash memory devices, electrical, optical, or other physical/tangible memory storage devices. The processor 445 is, for example, a microprocessor or microcontroller that executes instructions for the analytic recording logic 460. Thus, in general, the memory 450 may comprise one or more tangible (non-transitory) computer readable storage media (e.g., a memory device) encoded with software comprising computer executable instructions and when the software is executed (by the processor 445) it is operable to perform the operations described herein in connection with analytic recording module 255 (through execution of analytic recording logic 460).

FIG. 15 illustrates an example of a primarily software implementation of external recording server 250. It will be appreciated that in alternative examples the analytic recording logic 460 may be implemented, at least in part, with digital logic gates in one or more application-specific integrated circuits (ASICs).

The conference recording techniques disclosed herein may provide one or more advantages over conventional arrangements. In one example, the disclosed techniques may help technicians analyze, debug and troubleshoot customer voice and video quality issues using only conference recorded files. Time savings and productivity improvements are realized for developers and support engineers because extraction of additional data from the customer's conference is unnecessary. This may result in considerable cost savings in providing customer support.

In another example, the disclosed conference recording techniques may help technicians with timely resolution of their conferencing voice and video quality issues without requiring developers or support engineers to log into customer conferencing systems or monitor customer conferences. Customer information security and confidentiality are maintained as well as relieving them of inconvenience of delivering information to others and collaborating with support personnel.

Additionally, it will be appreciated the disclosed conference recording techniques are not limited to conference recording. Rather, these conference recording techniques may be used in connection with different voice over IP (VoIP) recording systems. For example, the techniques may be used to record point-to-point calls, transcoding sessions, VoIP gateway calls, individual participants who experience voice quality issue in a conference, and other similar audio and video sessions in the VoIP domain.

The disclosed conference recording techniques may reduce or substantially eliminate the burden of collecting logs, traces and information from different sources, systems and components used to debug analyze and troubleshoot audio and video quality issues. As noted, this reduces the labor costs involved for fixing all conferencing audio and video quality issues by reducing the time required by developers to acquire and analyze recorded audio and video data.

The above description is intended by way of example only.

What is claimed is:

1. A method comprising:
   at a conference server hosting a conference session in which a plurality of active speakers each participate at separate conference endpoints, receiving a plurality of audio signals each associated with one of the active speakers;
   mixing, at the conference server, the audio signals each associated with one of the active speakers to form a mixed audio signal;
   recording a mixed audio track that comprises the mixed audio signal;
   determining a relative loudness of each of the active speakers for given periods of time; and
   recording a plurality of original audio tracks that each comprises an original voice of one or more of the active speakers before mixing, wherein the original voice recorded in each of the original audio tracks during the given periods of time is based on the relative loudness of the active speakers.

2. The method of claim 1, wherein the active speakers comprise first and second active speakers, and wherein recording the plurality of original audio tracks comprises:
   recording a first original audio track that comprises an original voice of a loudest active speaker during the given periods of time; and
   recording a second original audio track that comprises an original voice of a second loudest speaker during the given periods of time.

3. The method of claim 2, wherein recording the first original audio track that comprises the original voice of the loudest speaker during the given periods of time comprises:
recording an original voice of the first active speaker for a first period of time; and
recording an original voice of the second active speaker for a second period of time.

4. The method of claim 2, further comprising:
associating original audio data with each of the first and second original audio tracks.

5. The method of claim 4, wherein associating the original audio data with each of the first and second original audio tracks comprises:
associating Real-time Transport Protocol information with each of the first and second original audio tracks.

6. The method of claim 4, wherein associating the original audio data with each of the first and second original audio tracks comprises:
associating media data with each of the first and second original audio tracks.

7. The method of claim 4, wherein associating the original audio data with each of the first and second original audio tracks comprises:
associating participant information with each of the first and second original audio tracks.

8. The method of claim 4, further comprising:
associating audio conference data representing energy levels of the mixed audio signals with the mixed audio track.

9. The method of claim 2, further comprising:
recording a first video file comprising video received from a conference endpoint of the loudest active speaker during the given periods of time.

10. The method of claim 9, wherein recording the first video file comprises:
recording a video received from a conference endpoint associated with the first active speaker for a first period of time; and
recording the video received from a conference endpoint associated with the second active speaker for a second period of time.

11. The method of claim 9, further comprising:
associating video conference data with the first video file.

12. The method of claim 9, further comprising:
recording a second video file comprising video received only from a conference endpoint of a single active speaker during the given periods of time.

13. The method of claim 9, further comprising:
transmitting the mixed audio signal to an external recording server; and
recording an external mixed audio track comprising the mixed audio signal received at the external recording server.

14. The method of claim 13, further comprising:
transmitting to the external recording server a conference video stream comprising video received from a conference endpoint of the loudest active speaker during the given periods of time; and
recording, at the external recording server, an external video file comprising video received from the conference endpoint of the loudest active speaker during the given periods of time.

15. The method of claim 14, further comprising:
associating original audio conference data obtained at the external recording server with the external mixed audio track; and
associating video conference data obtained at the external recording server with the external video file.

16. The method of claim 15, further comprising:
transmitting the audio signals associated with each of the active speakers to the external recording server;
recording, at the external recording server, a plurality of external original audio tracks that each comprise an original voice of one or more of the active speakers before mixing; and
associating original audio data obtained at the external recording server with each of the external original audio tracks.

17. The method of claim 1, further comprising:
receiving an indication of an audio or video quality issue detected during the conference session; and
analyzing the mixed audio track and the plurality of external original audio tracks to identify the audio or video quality issue detected during the conference session.

18. One or more non-transitory computer readable storage media encoded with software comprising computer executable instructions and when the software is executed operable to:
at a conference server hosting a conference session in which a plurality of active speakers each participate at separate conference endpoints, receiving a plurality of audio signals each associated with one of the active speakers;
mixing, at the conference server, the audio signals each associated with one of the active speakers to form a mixed audio signal;
recording a mixed audio track that comprises the mixed audio signal;
determining a relative loudness of each of the active speakers for given periods of time; and
recording a plurality of original audio tracks that each comprises an original voice of one or more of the active speakers before mixing, wherein the original voice recorded in each of the original audio tracks during the given periods of time is based on the relative loudness of the active speakers.

19. The non-transitory computer readable storage media of claim 18, wherein the active speakers comprise first and second active speakers, and wherein the instructions operable to record the plurality of original audio tracks comprise instructions operable to:
recording a first original audio track that comprises an original voice of a loudest active speaker during the given periods of time; and
recording a second original audio track that comprises an original voice of a second loudest speaker during the given periods of time.

20. The non-transitory computer readable storage media of claim 19, further comprising instructions operable to:
associate original audio data with each of the first and second original audio tracks.

21. The non-transitory computer readable storage media of claim 20, wherein the instructions operable to associate the original audio data with each of the first and second original audio tracks comprises instructions operable to:
associate Real-time Transport Protocol information with each of the first and second original audio tracks.

22. The non-transitory computer readable storage media of claim 20, wherein the instructions operable to associate the original audio data with each of the first and second original audio tracks comprises instructions operable to:
associate media data with each of the first and second original audio tracks.

23. The non-transitory computer readable storage media of claim 20, wherein the instructions operable to associate the original audio data with each of the first and second original audio tracks comprises instructions operable to:
associate participant information with each of the first and second original audio tracks.

24. The non-transitory computer readable storage media of claim 20, further comprising instructions operable to:
associate audio conference data representing energy levels of the mixed audio signals with the mixed audio track.

25. The non-transitory computer readable storage media of claim 19, further comprising instructions operable to:
record a first video file comprising video received from a conference endpoint of the loudest active speaker during the given periods of time.

26. The non-transitory computer readable storage media of claim 25, further comprising instructions operable to:
associate video conference data with the first video file.

27. The non-transitory computer readable storage media of claim 25, further comprising instructions operable to:
transmit the mixed audio signal to an external recording server; and
record an external mixed audio track comprising the mixed audio signal received at the external recording server.

28. The non-transitory computer readable storage media of claim 27, further comprising instructions operable to:
transmit to the external recording server a conference video stream comprising video received from a conference endpoint of the loudest active speaker during the given periods of time; and
record, at the external recording server, an external video file comprising video received from the conference endpoint of the loudest active speaker during the given periods of time.

29. An apparatus comprising:
one or more network interfaces; and
a processor coupled to the network interfaces at a conference server that is configured to host a conference session in which a plurality of active speakers participate each at separate conference endpoints, the processor being configured to:
receive a plurality of audio signals via one or more of the network interfaces, wherein the audio signals are each associated with one of the active speakers;
mix the audio signals each associated with one of the active speakers to form a mixed audio signal;
record a mixed audio track that comprises the mixed audio signal;
determine a relative loudness of each of the active speakers for given periods of time; and
record a plurality of original audio tracks that each comprises an original voice of one or more of the active speakers before mixing, wherein the original voice recorded in each of the original audio tracks during the given periods of time is based on the relative loudness of the active speakers.

30. The apparatus of claim 29, wherein the active speakers comprise first and second active speakers, and wherein the processor is configured to record a first original audio track that comprises an original voice of a loudest speaker during the given periods of time, and record a second original audio track that comprises an original voice of a second loudest speaker during the given periods of time.

31. The apparatus of claim 30, wherein the processor is further configured to associate original audio data with each of the first and second original audio tracks.

32. The apparatus of claim 31, wherein to associate the original audio data with each of the first and second original audio tracks the processor is configured to:
associate Real-time Transport Protocol information with each of the first and second original audio tracks.

33. The apparatus of claim 31, wherein to associate the original audio data with each of the first and second original audio tracks the processor is configured to:
associate media data with each of the first and second original audio tracks.

34. The apparatus of claim 31, wherein to associate the original audio data with each of the first and second original audio tracks the processor is configured to:
associate participant information with each of the first and second original audio tracks.

35. The apparatus of claim 31, wherein the processor is further configured to associate audio conference data representing energy levels of the mixed audio signals with the mixed audio track.

36. The apparatus of claim 30, wherein the processor is further configured to record a first video file comprising video received from a conference endpoint of the loudest active speaker during given periods of time.

37. The apparatus of claim 36, wherein the processor is configured to associate video conference data with the first video file.

* * * * *